US008918354B2

(12) United States Patent  (10) Patent No.: US 8,918,354 B2
Karnik et al.  (45) Date of Patent: Dec. 23, 2014

(54) INTELLIGENT INTENT DETECTION FROM SOCIAL NETWORK MESSAGES

(75) Inventors: Shardool Karnik, Issaquah, WA (US); Xiaolong Li, Sammamish, WA (US); Partha Sundaram, Sunnyvale, CA (US)

(73) Assignee: Microsoft Corporation, Redmond, WA (US)

( * ) Notice: Subject to any disclaimer, the term of this patent is extended or adjusted under 35 U.S.C. 154(b) by 324 days.

(21) Appl. No.: 13/251,294

(22) Filed: Oct. 3, 2011

(65) Prior Publication Data

US 2013/0085970 A1 Apr. 4, 2013

(51) Int. Cl.
*G06F 17/00* (2006.01)
*G06N 5/02* (2006.01)
*G06F 17/30* (2006.01)
*H04L 12/58* (2006.01)
*G06Q 50/00* (2012.01)

(52) U.S. Cl.
CPC ........ *G06F 17/30867* (2013.01); *H04L 12/588* (2013.01); *G06Q 50/01* (2013.01); *H04L 51/32* (2013.01)
USPC .......................................................... 706/45

(58) Field of Classification Search
CPC ......... G06N 5/02; G06N 99/00; G06Q 50/01; H04L 51/32; H04L 12/588; G06F 17/30867; G06F 17/30864; G06F 17/30699
USPC .............................................. 706/12, 14, 45
See application file for complete search history.

(56) References Cited

U.S. PATENT DOCUMENTS

| 2005/0125390 | A1* | 6/2005  | Hurst-Hiller et al. ........... 706/46 |
| 2007/0203903 | A1* | 8/2007  | Attaran Rezaei et al. ........ 707/5 |
| 2007/0245245 | A1  | 10/2007 | Blue et al. |
| 2007/0255831 | A1  | 11/2007 | Hayashi et al. |
| 2009/0228439 | A1* | 9/2009  | Manolescu et al. ............... 707/3 |
| 2010/0070457 | A1* | 3/2010  | Kejariwal et al. ............... 706/59 |
| 2010/0125604 | A1  | 5/2010  | Martinez et al. |
| 2010/0161592 | A1  | 6/2010  | Zhao |

OTHER PUBLICATIONS

Nagarajan, M. et al. "Monetizing User Activity on Social Networks." WWW2009, Apr. 20-24, 2009.*
Delgado, J. et al. User's privacy in applications provided through social networks. In Proceedings of second ACM SIGMM workshop on Social media. WSM '10. ACM. Oct. 25, 2010. pp. 39-44. doi>10.1145/1878151.1878163.*

(Continued)

*Primary Examiner* — Li-Wu Chang
*Assistant Examiner* — Benjamin Buss
(74) *Attorney, Agent, or Firm* — Dave Ream; Leonard Smith; Micky Minhas

(57) ABSTRACT

An intent engine that automatically detects user intent from messages of a social network (e.g., messages with questions to ask) and outputs intent data. The engine is intelligent in that it can process natural language input such as questions and terms. The user is then directed to an answer page filtered according to the intent data and which provides answers related to a question, for example. The intent engine can be designated (e.g., tagged, or "friended") and then linked into a specialized relationship (e.g., a "friend"). Accordingly, in one example, a URL link is constructed that points to the answer page, with filters configured based on the intent data. The URL is then sent back to the user as a friendly response. When the user selects the link, the user is presented with an answer page that provides answers which match the user intent derived from the user messages.

21 Claims, 7 Drawing Sheets

(56) References Cited

OTHER PUBLICATIONS

Baden, R. et al. "Persona: an online social network with user-defined privacy." In ACM SIGCOMM Computer Communication Review, vol. 39, No. 4, pp. 135-146. ACM, 2009. doi>10.1145/1594977.1592585.*

Baeza-Yates, R. et al. "Next generation web search." In Search Computing, LNCS 5950, pp. 11-23. Springer Berlin Heidelberg, 2010.*

Carmel, D. et al. "Personalized social search based on the user's social network." Proceedings of the 18th ACM conference on Information and knowledge management. ACM, Nov. 2009. pp. 1227-1236. DOI: 10.1145/1645953.1646109.*

Mendes Rodrigues, E. et al. "Socializing or knowledge sharing?: characterizing social intent in community question answering." In Proceedings of the 18th ACM conference on Information and knowledge management, pp. 1127-1136. ACM, Nov. 2009. doi>10.1145/1645953.1646096.*

Paul, T. et al. "Improving the Usability of Privacy Settings in Facebook." arXiv preprint arXiv:1109.6046v1, Sep. 27, 2011. 11 pages.*

Strohmaier, M. "Purpose tagging: capturing user intent to assist goal-oriented social search." In Proceedings of the 2008 ACM workshop on Search in social media, pp. 35-42. ACM, Oct. 2008. doi>10.1145/1458583.1458603.*

"Social Networks and Streams", Retrieved at <<http://research.microsoft.com/en-us/groups/osa/social_streams.aspx>>, Microsoft Research, Retrieved Date: Jun. 1, 2011.

"Social Networks Streams", Retrieved at <<http://research.microsoft.com/en-us/groups/osa/social_streams.aspx>>, Microsoft Research, Retrieved Date: Jun. 1, 2011.

"Surround & Intent Marketing", Retrieved at <<http://www.position2.com/surround-intent-marketing>>, Position2, Retrieved Date: Jun. 2, 2011.

"Social Networks and Streams", Retrieved at <<http://research.microsoft.com/en-us/groups/osa/social_streams.aspx>>, Microsoft Research, Retrieved Date: Jun. 1, 2011.

Lu, Dr. Qi, "Search and Social Media", Retrieved at <<http://advertising.microsoft.com/wwdocs/user/en-us/researchlibrary/researchreport/search-and-social-media-report.pdf>>, Microsoft Advertising and Internet Advertising Bureau, Retrieved Date: Jun. 2, 2011.

* cited by examiner

US 8,918,354 B2

INTELLIGENT INTENT DETECTION FROM SOCIAL NETWORK MESSAGES

BACKGROUND

The of users of social networks continues to steadily increase, which provides a new source of search engine business opportunity. Tapping into the data of social networks then offers myriad possible data handling and processing capabilities to not only better serve users but also vendors. Moreover, ways in which to provide more effective search results is a continuing challenge for vendors.

SUMMARY

The following presents a simplified summary in order to provide a basic understanding of some novel embodiments described herein. This summary is not an extensive overview, and it is not intended to identify key/critical elements or to delineate the scope thereof. Its sole purpose is to present some concepts in a simplified form as a prelude to the more detailed description that is presented later.

The disclosed architecture is an intent engine that automatically detects user intent from messages of a social network (e.g., messages with questions to ask) and outputs intent data. The engine is intelligent in that it can process natural language input such as questions and terms. The user is then directed to an answer page filtered according to the intent data and which provides answers related to a question, for example. The intent engine can be designated tagged, or "friended.", as referred to in some social networks) and then linked into a specialized relationship (e.g., a "friend"). Accordingly, in one example, a URL (uniform resource locator) link is constructed that points to the answer page, with filters configured based on the intent data. The URL is then sent back to the user as a friendly response. When the user selects the link, the user is presented with an answer page that provides answers which match the user intent as derived from the user social network messages. This assists the user in finding significantly more relevant results for their questions.

To the accomplishment of the foregoing and related ends, certain illustrative aspects are described herein in connection with the following description and the annexed drawings. These aspects are indicative of the various ways in which the principles disclosed herein can be practiced and all aspects and equivalents thereof are intended to be within the scope of the claimed subject matter. Other advantages and novel features will become apparent from the following detailed description when considered in conjunction with the drawings.

DETAILED DESCRIPTION

Figure 1:
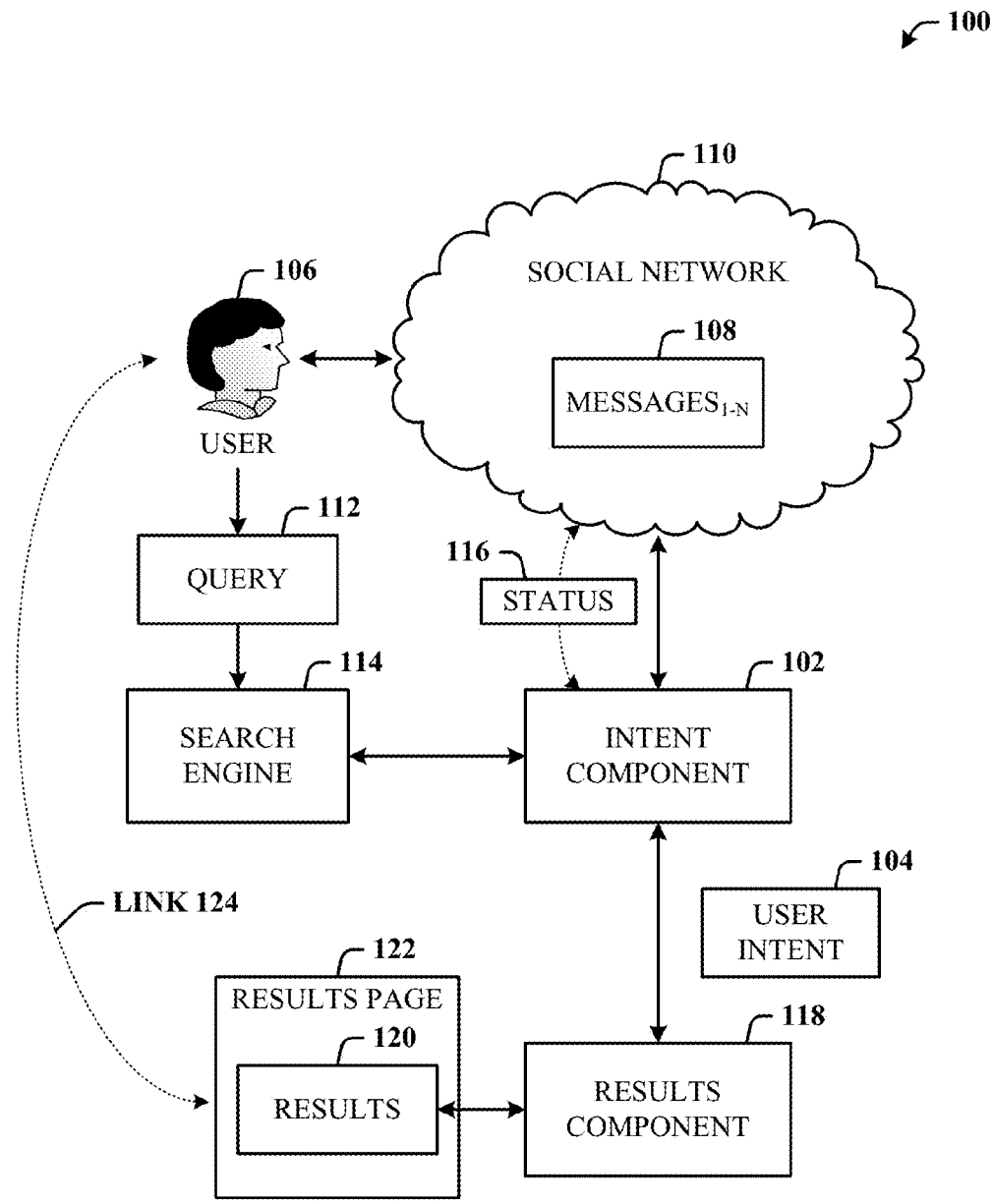
FIG. 1 illustrates a system in accordance with the disclosed architecture.

The disclosed architecture includes an intent engine to detect user's questions (queries) from social network messages and then sends intelligent high-quality answers back to the user. The intent engine operates as a member (social status) of the social network(s) (e.g., a "friend") which can answer user's queries.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well known structures and devices are shown in block diagram form in order to facilitate a description thereof. The intention is to cover all modifications, equivalents, and alternatives falling within the spirit and scope of the claimed subject matter.

FIG. 1 illustrates a system 100 in accordance with the disclosed architecture. The system 100 can include an intent component 102 that detects user intent 104 of a user 106 from messages 108 of the user 106 on a social network 110 as part of processing a user query 112 via a search engine 111. The intent component 102 is assigned a status 116 (e.g., a "friend") of the social network 110 that enables access to the user messages 108 of the social network 110. A results component 118 returns results 120 to the user query 112 for access by the user 106 based on the user intent 101.

The intent component 102 and results component 118 operate to provide answers (as results 120) to questions (queries) posed by the user 106 on the social network 110. The social network messages 108 can be used as training data for the intent component 102, which can be an intent engine. The intent component 102 improves the results 120 to the user 106 based on feedback of the user 106. In other words, when the user selects a result of the results 120, that interaction information can be monitored and fed back to improve the results generation for future queries and even the current query, should the user re-enter it for processing.

The results component 118 creates a results page 122 (e.g., a webpage) that presents the results 120, and the intent component 102 creates a link 124 to the results page 122. The link 124 is provided to the user 106 to access the results 120. The results 120 can be filtered based on the detected user intent 104. The intent component 102 analyzes the social network messages 108 and determines top (subset) popular domains in the messages 108. The intent component 102 processes the top domain messages to refine the results 120 to the user 106.

Figure 2:
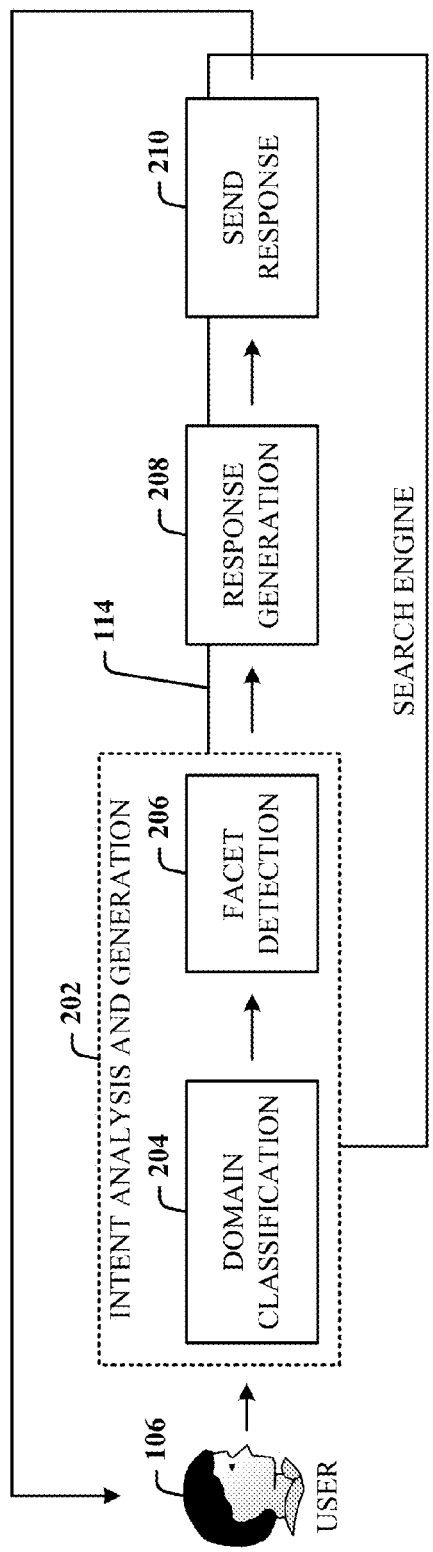
FIG. 2 illustrates a flow diagram of intent generation and processing in accordance with the disclosed architecture.

FIG. 2 illustrates a flow diagram 200 of intent generation and processing in accordance with the disclosed architecture. In operation, an account is setup in the social network which enables access to user messages (conversations). For Twitter™, a user can be requested to "follow" the account, or users can be requested to directly send tweets to the account. For Facebook™ users, access is enabled to user wall posts via a Facebook API (application programming interface) if the enabled by the user, etc.

A web service can be built which accepts user message input (e.g., in Twitter) or can monitor user posts (e.g., Facebook) at the backend to do domain classification and facet detection. If the service detects that the message falls into a specific domain (e.g., hotel, restaurant, movies, events, nightlife, flight, etc.), then the service calls an entity extractor to obtain detailed facet information (e.g., location, time, date, movie names, restaurant cuisine, etc), and then uses this information to construct a URL that points to the corresponding answer page, with filters set with those facet values.

The web service sends the URL back to the user as a "friend" response. The user may click the URL and contribute a query share to the search engine 114. The user may find that the answer page gives a good answer, and then passes this experience on by sending the service link to friends. Moreover, the more that users interact with the service, the more the amount of training data that can be utilized to improve the intent engine.

Continuing with FIG. 2, flow begins with the user 106 interacting in social network conversations. The conversations (messages) are then accessed as input to intent analysis and generation, at 202. For example, if a user query is first detected in a "restaurant" domain, an entity extractor is run to find out the details of this query, such as "restaurant name", "location", etc. This is efficient, since only running the restaurant entity extractor for a query classified to be a specific domain and the entity extractor can be more expensive to run than the domain classifier. In the backend, possible facets can be defined in a schema file for each domain. Given a user query, the entity extractor detects if there are any facets appearing in this query from the predefined schema, and outputs the facets and associated facet values.

Accordingly, intent analysis begins with domain classification 204, followed by facet detection 206. At 208, response (answer) generation is performed, and then the response (link to answers) is sent back to the user 106, as indicated at 210. Note that intent processing can occur in parallel with normal search engine processing. Thus, search engine results can also be considered for the results (e.g., answers) page of the intent engine.

Included herein is a set of flow charts representative of exemplary methodologies for performing novel aspects of the disclosed architecture. While, for purposes of simplicity of explanation, the one or more methodologies shown herein, for example, in the form of a flow chart or flow diagram, are shown and described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

Figure 3:
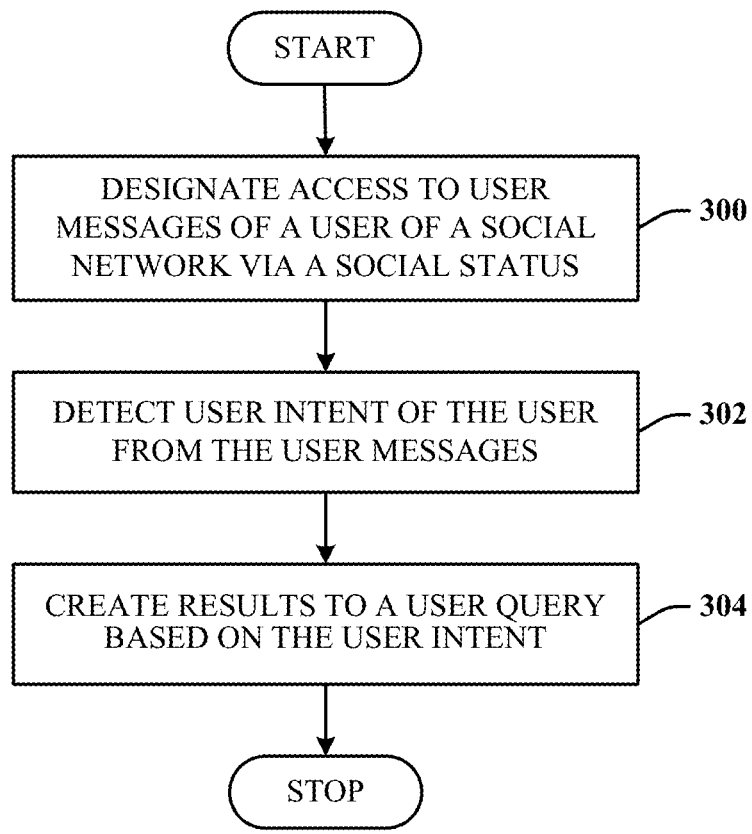
FIG. 3 illustrates a method in accordance with the disclosed architecture.

FIG. 3 illustrates a method in accordance with the disclosed architecture. At 300, access to user message's of a user of a social network is designated via a social status (e.g., "friend"). At 302, user intent of the user is detected from the user messages. At 304, results to a user query are created based on the user intent.

Figure 4:
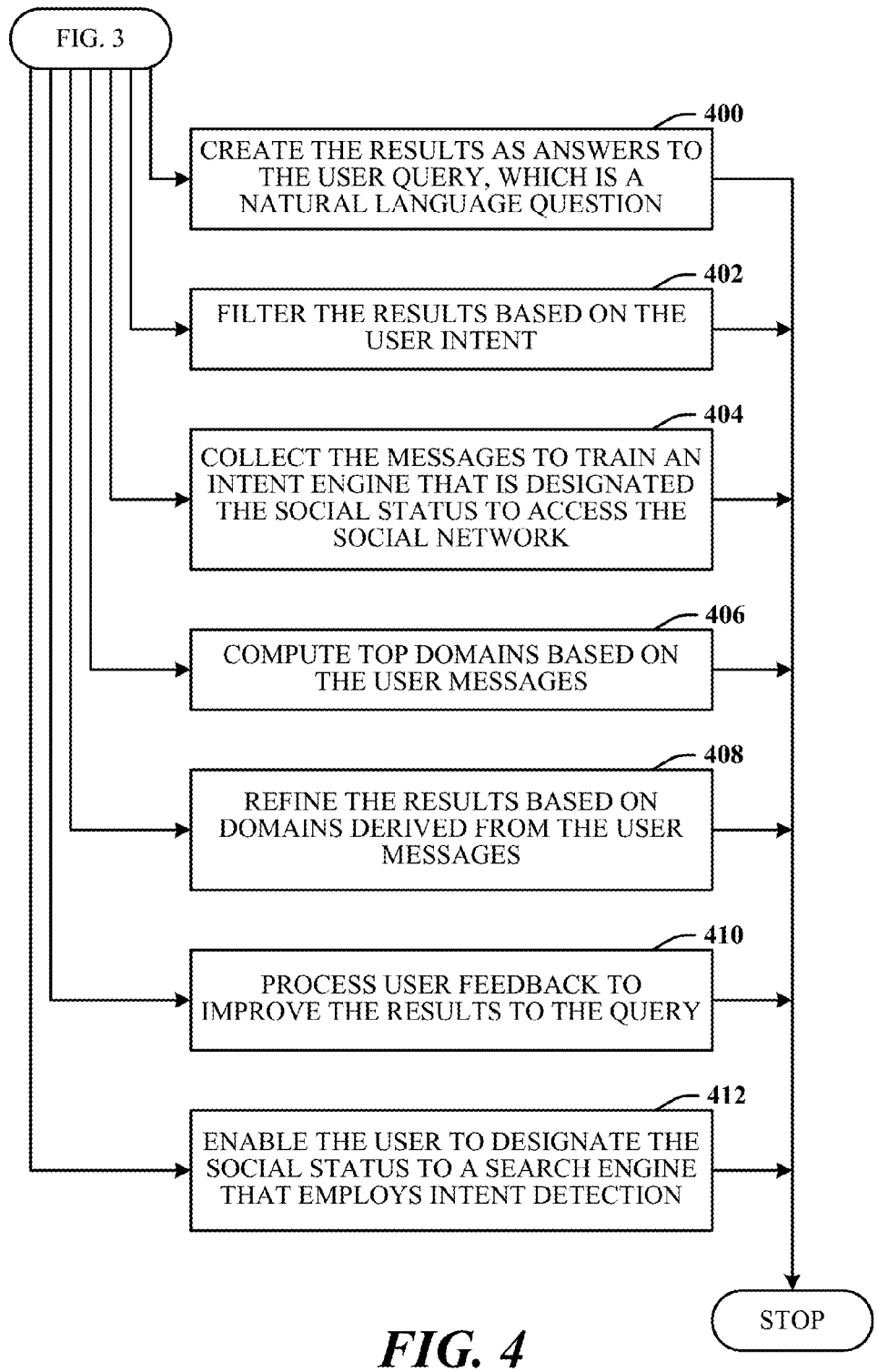
FIG. 4 illustrates further aspects of the method of FIG. 3.

FIG. 4 illustrates further aspects of the method of FIG. 3. Note that the flow indicates that each block can represent a step that can be included, separately or in combination with other blocks, as additional aspects of the method represented by the flow chart of FIG. 3. At 400, the results are created as answers to the user query, which is a natural language question. At 402, the results are filtered based on the user intent. At 404, the messages are collected to train an intent engine that is designated the social status to access the social network. At 406, top domains are computed based on the user messages. At 408, the results are refined based on domains derived from the user messages. At 410, user feedback is processed to improve the results to the query. At 412, the user is enabled to designate the social status to a search engine that employs intent detection.

Figure 5:
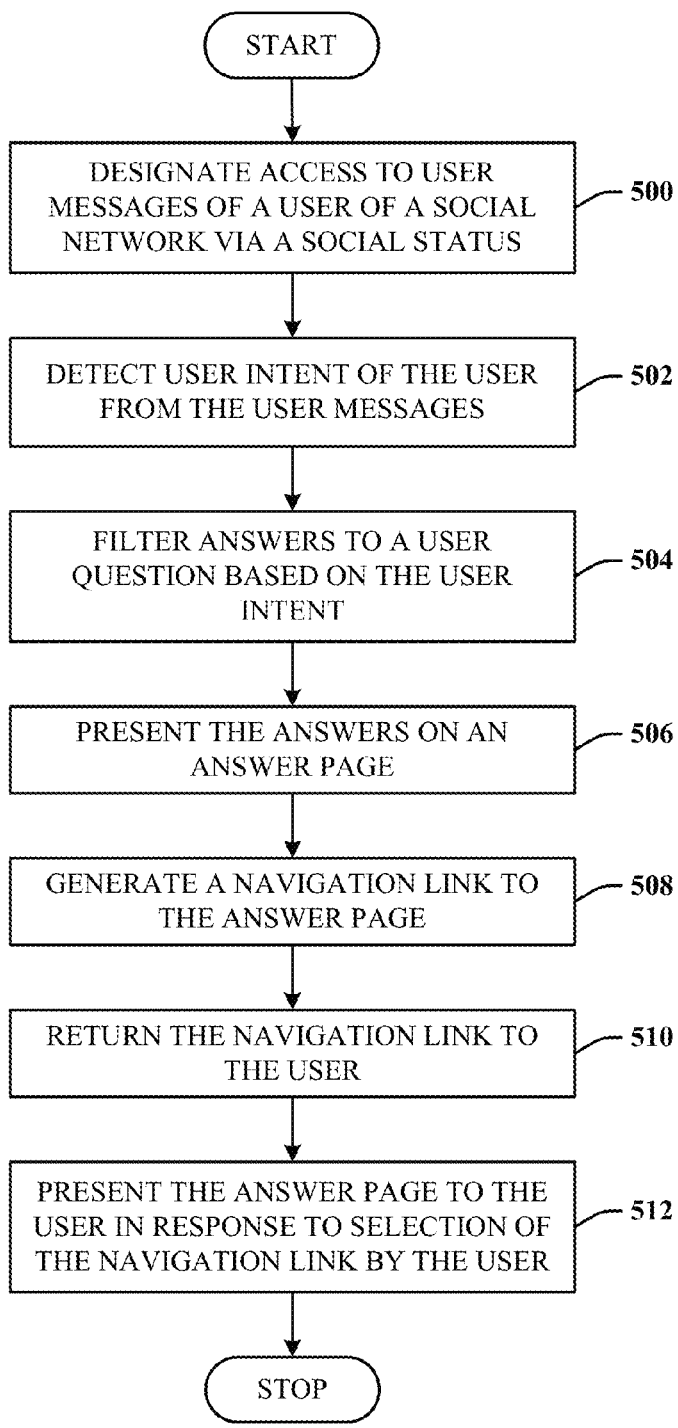
FIG. 5 illustrates an alternative method in accordance with the disclosed architecture.

FIG. 5 illustrates an alternative method in accordance with the disclosed architecture. At 500, access to user messages of a user of a social network is designated via a social status. At 502, user intent of the user is detected from the user messages. At 504, answers to a user question are filtered based on the user intent. At 506, the answers are presented on an answer page. At 508, a navigation link to the answer page is generated. At 510, the navigation link is returned to the user. At 512, the answer page is presented to the user in response to selection of the navigation link by the user.

Figure 6:
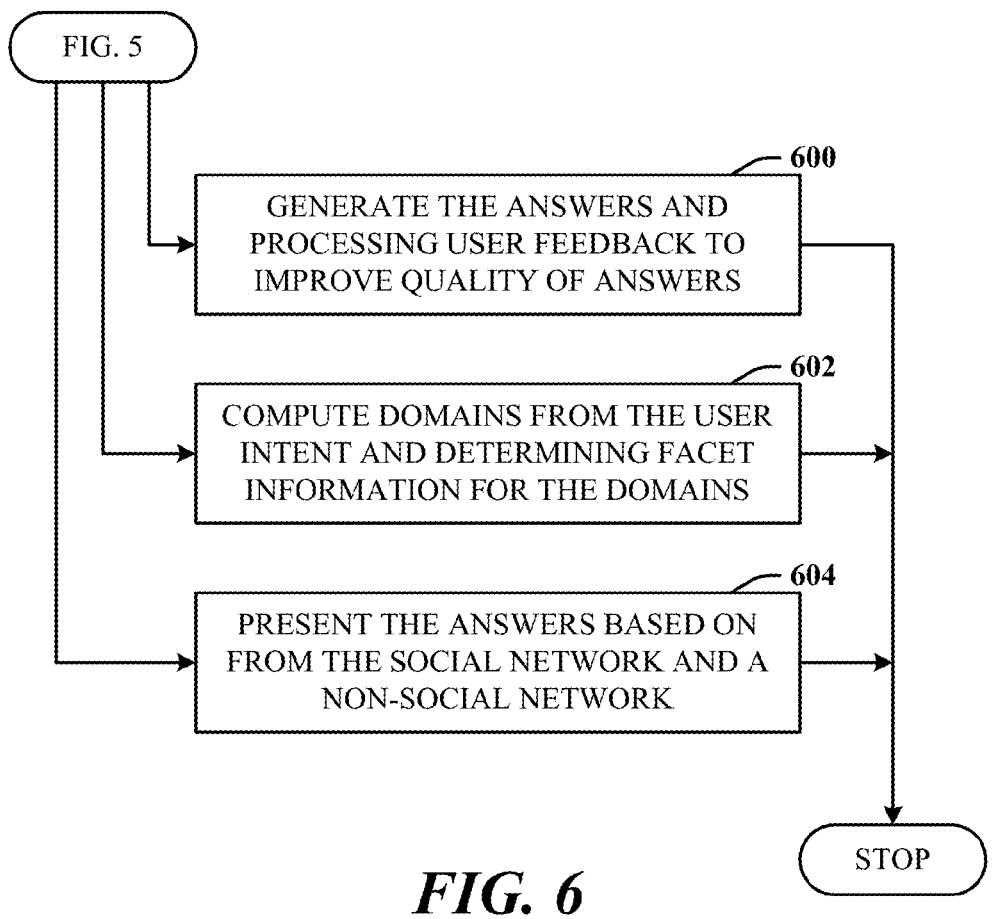
FIG. 6 illustrates further aspects of the method of FIG. 5.

FIG. 6 illustrates further aspects of the method of FIG. 5. Note that the flow indicates that each block can represent a step that can be included, separately or in combination with other blocks, as additional aspects of the method represented by the flow chart of FIG. 5. At 600, the answers are generated and user feedback is processed to improve quality of answers. At 602, domains are computed from the user intent and facet information determined for the domains. At 604, the answers are presented based on from the social network and a non-social network.

As used in this application, the terms "component" and "system" are intended to refer to a computer-related entity, either hardware, a combination of software and tangible hardware, software, or software in execution. For example, a component can be, but is not limited to, tangible components such as a processor, chip memory, mass storage devices (e.g., optical drives, solid state drives, and/or magnetic storage media drives), and computers, and software components such as a process running on a processor, an object, an executable, a data structure (stored in volatile or non-volatile storage media), a module, a thread of execution, and/or a program. By way of illustration, both an application running on a server and the server can be a component. One or more components can reside within a process and/or thread of execution, and a component can be localized on one computer and/or distributed between two or more computers. The word "exemplary" may be used herein to mean serving as an example, instance, or illustration. Any aspect or design described herein as "exemplary" is not necessarily to be construed as preferred or advantageous over other aspects or designs.

Figure 7:
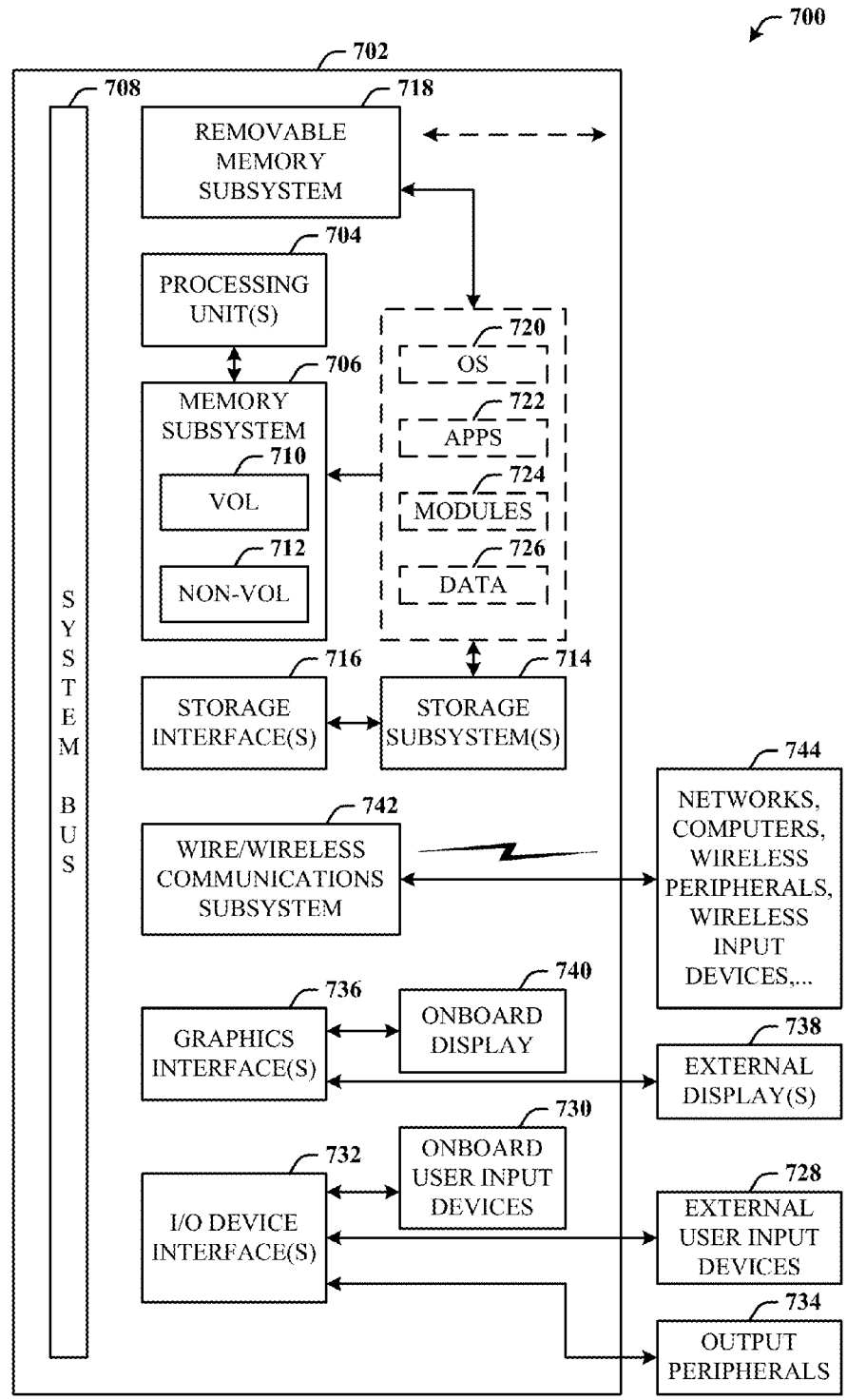
FIG. 7 illustrates a block diagram of a computing system that executes intent processing in accordance with the disclosed architecture.

Referring now to FIG. 7, there is illustrated a block diagram of a computing system 700 that executes intent processing in accordance with the disclosed architecture. However, it is appreciated that the some or all aspects of the disclosed methods and/or systems can be implemented as a system-on-a-chip, where analog, digital, mixed signals, and other functions are fabricated on a single chip substrate. In order to provide additional context for various aspects thereof, FIG. 7 and the following description are intended to provide a brief, general description of the suitable computing system 700 in which the various aspects can be implemented. While the description above is in the general context of computer-executable instructions that can run on one or more computers, those skilled in the art will recognize that a novel embodiment also can be implemented in combination with other program modules and/or as a combination of hardware and software.

The computing system 700 for implementing various aspects includes the computer 702 having processing unit(s) 704, a computer-readable storage such as a system memory 706, and a system bus 708. The processing unit(s) 704 can be any of various commercially available processors such as single-processor, multi-processor, single-core units and multi-core units. Moreover, those skilled in the art will appreciate that the navel methods can be practiced with other computer system configurations, including minicomputers, mainframe computers, as well as personal computers (e.g., desktop, laptop, etc.), hand-held computing devices, microprocessor-based or programmable consumer electronics, and the like, each of which can be operatively coupled to one or more associated devices.

The system memory 706 can include computer-readable storage (physical storage media) such as a volatile (VOL) memory 710 (e.g., random access memory (RAM)) and non-volatile memory (NON-VOL) 712 (e.g., ROM, EPROM, EEPROM, etc.). A basic input/output system (BIOS) can be stored in the non-volatile memory 712, and includes the basic routines that facilitate the communication of data and signals between components within the computer 702, such as during startup. The volatile memory 710 can also include a high-speed RAM such as static RAM for caching data.

The system bus 708 provides an interface for system components including, but not limited to, the system memory 706 to the processing unit(s) 704. The system bus 708 can be any of several types of bus structure that can further interconnect to a memory bus (with or without a memory controller), and a peripheral bus (e.g., PCI, PCIe, AGP, LPC, etc.), using any of a variety of commercially available bus architectures.

The computer 702 further includes machine readable storage subsystem(s) 714 and storage interface(s) 716 for interfacing the storage subsystem(s) 714 to the system bus 708 and other desired computer components. The storage subsystem(s) 714 (physical storage media) can include one or more of a hard disk drive (HDD), magnetic floppy disk drive (FDD), and/or optical disk storage drive (e.g., a CD-ROM drive DVD drive), for example. The storage interface(s) 716 can include interface technologies such as EIDE, ATA, SATA, and IEEE 1394, for example.

One or more programs and data can be stored in the memory subsystem 706, a machine readable and removable memory subsystem 718 flash drive form factor technology), and/or the storage, subsystem(s) 714 (e.g., optical, magnetic, solid state), including an operating system 720, one or more application programs 722, other program modules 724, and program data 726.

The operating system 720, one or more application programs 722, other program modules 724, and/or program data 726 can include entities and components of the system 100 of FIG. 1, entities and components of the flow diagram 200 of FIG. 2, and the methods represented by the flowcharts of FIGS. 3-6, for example.

Generally, programs include routines, methods, data structures, other software components, etc., that perform particular tasks or implement particular abstract data types. All or portions of the operating system 720, applications 722, modules 724, and/or data 726 can also be cached in memory such as the volatile memory 710, for example. It is to be appreciated that the disclosed architecture can be implemented with various commercially available operating systems or combinations of operating systems (e.g., as virtual machines).

The storage subsystem(s) 714 and memory subsystems (706 and 718) serve as computer readable media for volatile and non-volatile storage of data, data structures, computer-executable instructions, and so forth. Such instructions, when executed by a computer or other machine, can cause the computer or other machine to perform one or more acts of a method. The instructions to perform the acts can be stored on one medium, or could be stored across multiple media, so that the instructions appear collectively on the one or more computer-readable storage media, regardless of whether all of the instructions are on the same media.

Computer readable media can be any available media that can be accessed by the computer 702 and includes volatile and Bon-volatile internal and/or external media that is removable or non-removable. For the computer 702, the media accommodate the storage of data in any suitable digital format. It should be appreciated by those skilled in the art that other types of computer readable media can be employed such as zip drives, magnetic tape, flash memory cards, flash drives, cartridges, and the like, for storing computer executable instructions for performing the novel methods of the disclosed architecture.

A user can interact with the computer 702, programs, and data using external user input devices 728 such as a keyboard and a mouse. Other external user input devices 728 can include a microphone, an IR (infrared) remote control, a joystick, a game pad, camera recognition systems, a stylus pen, touch screen, gesture systems eye movement, head movement, etc.), and/or the like. The user can interact with the computer 702, programs, and data using onboard user input devices 730 such a touchpad, microphone, keyboard, etc., where the computer 702 is a portable computer, for example. These and other input devices are connected to the processing unit(s) 704 through input/output (PO) device interface(s) 732 via the system bus 708, but can be connected by other interfaces such as a parallel port, IEEE 1394 serial port, a game port, a USB port, an IR interface, short-range wireless (e.g., Bluetooth) and other personal area network (PAN) technologies, etc, The I/O device interface(s) 732 also facilitate the use of output peripherals 734 such as printers, audio devices, camera devices, and so on, such as a sound card and/or onboard audio processing capability.

One or more graphics interface(s) 736 (also commonly referred to as a graphics processing unit (GPU) provide graphics and video signals between the computer 702 and external display(s) 738 (e.g., LCD, plasma) and/or onboard displays 740 for portable computer). The graphics interface(s) 736 can also be manufactured as part of the computer system board.

The computer 702 can operate in a networked environment (e.g., IP-based) using logical connections via a wired/wireless communications subsystem 742 to one or more networks and/or other computers. The other computers can include workstations, servers, routers, personal computers, microprocessor-based entertainment appliances, peer devices or other common network nodes, and typical include many or all of the elements described relative to the computer 702. The logical connections can include wired/wireless connectivity to a local area network (LAN), a wide area network (WAN), hotspot, and so on. LAN and WAN networking environments are commonplace in offices and companies and facilitate enterprise-wide computer networks, such as intranets, all of which may connect to a global communications network such as the Internet.

When used in a networking environment the computer 702 connects to the network via a wired/wireless communication subsystem 742 (e.g., a network interface adapter, onboard transceiver subsystem, etc.) to communicate with wired/wireless networks, wired/wireless printers, wired/wireless input devices 744, and so on. The computer 702 can include a modem or other means for establishing communications over the network. In a networked environment, programs and data relative to the computer 702 can be stored in the remote memory/storage device, as is associated with a distributed system. It will be appreciated that the network connections shown are exemplary and other means of establishing a communications link between the computers can be used.

The computer 702 is operable to communicate with wired/wireless devices or entities using the radio technologies such as the IEEE 802.xx family of standards, such as wireless devices operatively disposed in wireless communication (e.g., WEE 802.11 over-the-air modulation techniques) with, for example, a printer, scanner, desktop and/or portable computer, personal digital assistant (PDA), communications satellite, any piece of equipment or location associated with a wirelessly detectable tag (e.g., a kiosk, news stand, restroom), and telephone. This includes at least WiFi™ (used to certify the interoperability of wireless computer networking devices) for hotspots, WiMax, and Bluetooth™ wireless technologies. Thus, the communications can be a predefined structure as with a conventional network or simply an ad hoc communication between at least two devices networks use radio technologies called IEEE 802.11x (a, b, g, etc.) to provide secure, reliable, fast wireless connectivity. A Wi-Fi network can be used to connect computers to each other, to the Internet, and to wire networks (which use IEEE 802.3-related media and functions).

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system, comprising:
   an intent component configured to detect user intent of a user from messages of the user on a social network, to determine questions posed by the user in the messages, the intent component assigned a status of the social network that enables access to the user messages of the social network;
   a results component configured to return results comprising answers to the questions posed by the user, the results returned based on the user intent, the results being provided on an answers page; and
   a microprocessor configured to execute computer-executable instructions associated with at least one of the intent component or the results component.

2. The system of claim 1, wherein a uniform resource locator is constructed to point to the answers page that includes the answers to the questions posed by the user on the social network.

3. The system of claim 1, wherein the social network messages are used as training data for the intent component, which is an intent engine.

4. The system of claim 1, wherein the intent component improves the results to the user based on feedback of the user.

5. The system of claim 1, wherein the results component creates the answers page and the intent component creates a link to the answers page, the link provided to the user to access the results.

6. The system of claim 5, wherein the results are filtered based on the detected intent.

7. The system of claim 1, wherein the intent component analyzes the social network messages and determines top popular domains in the messages.

8. The system of claim 7, wherein the intent component processes the top domain messages to refine results to the user.

9. A method comprising acts of:
   designating access to user messages of a user of a social network to an intent engine via a social status;
   detecting user intent of the user from the user messages using the intent engine to determine a question posed by the user in the messages;
   creating results by outputting answers to the question posed by the user, the results based on the user intent;
   providing the results to the user on an answers page; and
   configuring at least one processor that executes instructions stored in memory to perform the acts of designating, detecting, providing, and creating.

10. The method of claim 9, further comprising creating the results as answers to the question posed by the user, which is a natural language question.

11. The method of claim 9, further comprising filtering the results based on the user intent.

12. The method of claim 9, further comprising collecting the messages to train the intent engine.

13. The method of claim 9, further comprising computing top domains based on the user messages.

14. The method of claim 9, further comprising refining the results based on domains derived from the user messages.

15. The method of claim 9, further comprising processing user feedback to improve the results.

16. The method of claim 9, further comprising enabling the user to designate the social status to a search engine that employs intent detection.

17. A method comprising acts of:
   designating access to user messages of a user of a social network to an intent engine via a social status;
   detecting user intent of the user from the user messages to determine a user question posed by the user in the messages using the intent engine;
   filtering answers to the user question based on the user intent;
   presenting the answers on an answer page;
   generating a navigation link to the answer page;
   returning the navigation link to the user;
   presenting the answer page to the user in response to selection of the navigation link by the user; and
   configuring at least one processor that executes instructions stored in memory to perform the acts of designating, detecting, filtering, presenting, generating, and returning.

18. The method of claim 17, further comprising generating the answers and processing user feedback to improve quality of answers.

19. The method of claim 17, further comprising computing domains from the user intent and determining facet information for the domains.

20. The method of claim 17, further comprising presenting the answers based on the social network and a non-social network.

21. A computer-readable storage medium comprising instructions that when executed by a hardware processor, cause the processor to perform acts comprising:
   designating access to user messages of a user of a social network to an intent engine via a social status;
   detecting user intent of the user from the user messages using the intent engine to determine a question posed by the user in the messages;

creating results by outputting answers to the question posed by the user, the results based on the user intent; and providing the results to the user on an answers page.

* * * * *